(12) United States Patent
Kaprinidis et al.

(10) Patent No.: US 7,138,448 B2
(45) Date of Patent: Nov. 21, 2006

(54) FLAME RETARDANT COMPOSITIONS

(75) Inventors: Nikolas Kaprinidis, New York, NY (US); Nicola Lelli, New York, NY (US); Rene Kierkels, Beegden (NL)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 358 days.

(21) Appl. No.: 10/690,097

(22) Filed: Oct. 21, 2003

(65) Prior Publication Data

US 2004/0138351 A1    Jul. 15, 2004

Related U.S. Application Data

(60) Provisional application No. 60/423,678, filed on Nov. 4, 2002.

(51) Int. Cl.
*C08K 5/3495* (2006.01)
*C08K 5/06* (2006.01)

(52) U.S. Cl. ......................... 524/101; 524/464; 524/469

(58) Field of Classification Search ........ 524/100–101, 524/127, 140–145, 464–470
See application file for complete search history.

(56) References Cited

U.S. PATENT DOCUMENTS

| | | | |
|---|---|---|---|
| 3,819,575 A | 6/1974 | Green ..................... 260/45.75 |
| 3,959,219 A | 5/1976 | Aoyama et al. ......... 260/45.75 |
| 4,504,611 A | 3/1985 | Ilardo et al. ................. 524/101 |
| 5,204,393 A | 4/1993 | Nalepa et al. ............... 524/101 |
| 5,356,568 A | 10/1994 | Levine ........................ 252/606 |
| 5,393,812 A | 2/1995 | Haley et al. .................... 524/91 |
| 5,475,041 A | 12/1995 | Weil et al. .................... 524/100 |
| 5,578,666 A * | 11/1996 | Weil et al. .................... 524/100 |
| 5,643,980 A | 7/1997 | Shindoh et al. ............. 524/100 |
| 5,853,886 A | 12/1998 | Pinnavaia .................... 428/403 |
| 6,020,419 A | 2/2000 | Bock et al. .................. 524/590 |
| 6,114,421 A | 9/2000 | Malcangi .................... 524/100 |
| 2002/0096669 A1 | 7/2002 | Van Der Spek et al. .... 252/601 |
| 2002/0120041 A1 | 8/2002 | Zingg et al. ................. 524/100 |
| 2003/0149143 A1 | 8/2003 | Horsey et al. ............... 524/199 |
| 2004/0087689 A1 * | 5/2004 | Kaprinidis et al. ............ 524/99 |
| 2004/0097620 A1 * | 5/2004 | Kaprinidis et al. ............ 524/99 |
| 2004/0116565 A1 | 6/2004 | Kaprinidis et al. ......... 524/247 |

FOREIGN PATENT DOCUMENTS

GB    2085898    5/1982

OTHER PUBLICATIONS

Derwent Abstr. 1979-75950B [42] for JP 54113647 (1979).
Derwent Abstr. 1982-46877E [23] for JP 57070152 (1982).
Derwent Abstr. 1983-719423 [30] for JP 58101128 (1983).
Derwent Abstr. 1998-422469 [36] for JP 10176095 (1998).

* cited by examiner

*Primary Examiner*—Peter Szekely
(74) *Attorney, Agent, or Firm*—Tyler A. Stevenson

(57) ABSTRACT

Organic polymer substrates, for example polyolefins such as polypropylene, can be made flame retardant by the incorporation of a mixture of (i) at least one melamine based flame retardant and (ii) at least one flame retardant selected from the group consisting of the organohalogen and phosphorus containing flame retardants. Further optional flame retardants include antimony compounds and sterically hindered amines.

19 Claims, No Drawings

FLAME RETARDANT COMPOSITIONS

This application claims the benefit under 35 USC 119(e) of U.S. Provisional Application Ser. No. 60/423,678, filed Nov. 4, 2002.

The instant invention pertains to a novel method of flame retarding a polymeric substrate by adding thereto an effective flame retarding amount of a mixture of at least one melamine based flame retardant and at least one flame retardant selected from the group consisting of the organohalogen and phosphorus containing flame retardants.

The instant invention in particular pertains to a method of flame retarding polyolefins such as polypropylene and polyethylene.

BACKGROUND OF THE INVENTION

U.S. Pat. No. 4,504,611 teaches flame retardant polyamide comprising zinc borate, melamine cyanurate and certain organohalogens.

JP 54113647 discloses flame retardant polyamide comprising melamine cyanurate and DBDPO.

GB 2085898 discloses flame retardant polyolefin comprising aromatic bromo hydrocarbon (DBDPO), an antimony or bismuth compound, an organic compound, and a triazine derivative (e.g. melamine).

JP 57070152 teaches flame retardant epoxy resins which contain antimony trioxide, an orgaonobromine compound and a melamine-cyanuric acid adduct.

JP 58101128 teaches flame retardant epoxy resin, phenol resin, thermoset polyester resin or polyurethane resin, which contain antimony trioxide, organohalogen compound, melamine-cyanuric acid product, melamine-phosphoric acid product and melamine-molybdic acid product.

U.S. Pat. No. 5,356,568 teaches flame retardant coatings that comprise phosphorus-containing material (e.g. melamine phosphate) and a halogen-containing material (e.g. chlorinated paraffin).

JP 10176095 discloses flame retardant polystyrene comprising organohalogen compounds and ammonium polyphosphates and/or triazine phosphates (e.g. melamine phosphate) and a drip-proof agent.

It has been found that polymers with good flame retardant properties, for example polyolefins, are prepared when a melamine based flame retardant is added thereto together with an organohalogen flame retardant or a phosphorus containing flame retardant.

DETAILED DISCLOSURE

The instant invention pertains to a flame retardant polymer composition which comprises
 (a) an organic polymer substrate and
 (b) an effective flame retarding amount of a mixture of
   (i) at least one melamine based flame retardant and
   (ii) at least one flame retardant selected from the group consisting of the organohalogen and the phosphorus containing flame retardants.

The mixture of (i) and (ii) is in many instances synergistic towards providing flame retardancy.

The compositions of this invention may further include flame retardant fillers and/or conventional fillers. Flame-retardant fillers are known in the art and are selected from the group consisting of magnesium hydroxide, alumina trihydrate and zinc borate. Flame-retardant fillers are inorganic compounds employed for flame-retardant properties, and at high enough levels to be considered "filler". Conventional fillers such as talc, calcium carbonate and the like are normally employed for instance for flow properties in order to reduce the spread of flaming droplets (not flame-retardant per se).

The compositions of this invention may further include nano-scaled fillers. Nano-scaled fillers are also referred to as "nanoclays" are disclosed for example in U.S. Pat. Nos. 5,853,886 and 6,020,419, the relevant disclosures of which are hereby incorporated by reference.

Nano-scaled fillers of the present invention are for example phyllosilicates or smectite clays, for example organophilic phyllosilicates, naturally occuring phyllosilicates, synthetic phyllosilicates or a mixture of such phyllosilicates. The present nano-scaled fillers are for example montmorillonites, bentonites, beidellites, hectorites, saponites or stevensites.

The present compositions may further advantageously include antimony compounds such as antimony trioxide ($Sb_2O_3$) or antimony pentoxide ($Sb_2O_5$). The antimony compounds may be present from about 0.5% to about 8% by weight, based on the weight of the polymer substrate. For example, the antimony compounds may be present from about 1% to about 6% by weight, or from about 2% to about 5% by weight, based on the weight of the polymer substrate. For example, the antimony compounds may be present at about 2%, 3%, 4% or 5% by weight, based on the weight of the polymer substrate.

The present compositions may further advantageously include sterically hindered amine stabilizers. The sterically hindered amines may be present from about 0.1% to about 10% by weight, based on the weight of the polymer substrate.

In particular, the present compositions may include both antimony compounds and sterically hindered amine stabilizers.

The present compositions may advantageously include acid scavengers. Acid scavengers are for example hydrotalcites and amorphous basic aluminum magnesium carbonates, such as those described in U.S. Pat. Nos. 4,427,816, 5,106,898 and 5,234,981, the relevant disclosures of which are hereby incorporated by reference. Hydrotalcite is, also known as hycite or DHT4A.

Hydrotalcites are natural or synthetic. The natural hydrotalcite is held to possess a structure $Mg_6Al_2(OH)_{16}CO_3.4\ H_2O$. A typical empirical formula of a synthetic hydrotalcite is $Al_2Mg_{4.35}OH_{11.36}CO_{3(1.67)}.x\ H_2O$. Examples of the synthetic product include: $Mg_{0.7}Al_{0.3}(OH)_2(CO_3)_{0.15}.0.54\ H_2O$, $Mg_{4.5}Al_2(OH)_{13}CO_3.3.5\ H_2O$ and $Mg_{4.2}Al(OH)_{12.4}CO_3$.

The present compositions meet requirements of UL 1694 Tests for Flammability of Small Polymeric Component Materials, 2002. The present compositions also meet requirements of UL 94 Tests for Flammability of Plastic Materials for Parts in Devices and Appliances.

The present compositions also exhibit excellent physical properties as exhibited by tensile strength and/or impact strength.

The present compositions do not require organic radical sources to meet for example a V-0, V-1 or a V-2 threshold according to UL 94, or to meet a SC-0, SC-1 or SC-2 level according to UL 1694. The organic radical sources are for example compounds of formula (1) according to GB 2085898, for example (2,3-dimethyl-2,3-diphenyl)-hexane or -butane.

Meeting V-0, V-1 or V-2 according to UL 94, or meeting SC-0, SC-1 or SC-2 according to UL 1694 is considered "passing" UL 94 or UL 1694 respectively.

The compounds of formula (1) of GB 2085898 are

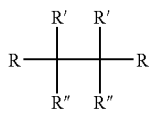

where R=CH$_3$ or C$_2$H$_5$, R'=CH$_3$ and R"=C$_6$H$_5$.

Accordingly, the present compositions comprise essentially no organic radical sources, or comprise no organic radical sources.

Both clear and pigmented polymer compositions, for example pigmented polypropylene compositions, meet V-0, V-1 or V-2 according to UL 94 or SC-0, SC-1 or SC-2 according to UL 1694.

The present compositions also meet V-0, V-1 or V-2 according to UL-94 or SC-0, SC-1 or SC-2 according to UL 1694 after weathering exposure (ultraviolet light exposure), for example after exposure to 1000 hours in a xenon arc WeaterOmeter, Atlas CI 65A xenon arc WeaterOmeter, ASTM G26 test method A. After exposure, the compositions also retain at least 75% of izod impact strength and tensile strength.

The present compositions also meet V-0, V-1 or V-2 or SC-0, SC-1 or SC-2 performance levels according to UL 94 or UL 1694 respectively, after exposure to water, for example after immersion in water for 7 days at 70° C. After water immersion, the samples also retain at least 50% of izod impact strength and tensile strength.

The present compositions also meet V-0, V-1 or V-2 or SC-0, SC-1 or SC-2 performance levels according to UL 94 or UL 1694 respectively, after thermal exposure, for example after oven aging at different elevated temperatures (130, 140, 150 and 160° C. for 9000 hrs, 5000 hrs, 2500 hrs and 1000 hrs, respectively), or at 90C for 2000 hours. The oven is a regular air forced oven. After the exposure, the samples also retain at least 65% of physical properties such as izod impact and tensile strength.

The compositons are for example polypropylene homopolymer plaques comprising the present flame retardant additives, for example 1.6 mm plaques. The polypropylene plaques are clear or pigmented, for instance white or green pigmented.

Polymer Substrate (a)

The polymer substrate of component (a) is any of a wide variety of polymer types including polyolefins, polystyrenics, and PVC. For example, the polymer substrate may be selected from the group of resins consisting of the polyolefins, the thermoplastic olefins, styrenic polymers and copolymers, ABS and polymers which contain hetero atoms, double bonds or aromatic rings. Specific embodiments are where component (a) is polypropylene, polyethylene, thermoplastic olefin (TPO), ABS or high impact polystyrene.

For example, the polymer substrate is selected from the group of resins consisting of the polyolefins, the thermoplastic olefins, styrenic polymers and copolymers, and ABS.

Another embodiment of the present invention is where the polymer substrate is selected from the group consisting of polypropylene, polyethylene, thermoplastic olefin (TPO), ABS and high impact polystyrene.

For instance, the polymer substrate is polypropylene, polyethylene or thermoplastic olefin (TPO). Organic polymers of component A are for example thermoplastic polymers such as polyolefins like polyethylene, polypropylene or copolymers thereof. The thermoplastic polymer is for example polypropylene.

Further examples for organic polymers (component A) are:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, for example polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyis and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

Homopolymers and copolymers from 1. )–4. ) may have any stereostructure including syndiotactic, isotactic, hemi-isotactic or atactic; for example atactic polymers. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; for example atactic polymers. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; for example atactic polymers. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral; polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.
20. Polyketones.
21. Polysulfones, polyether sulfones and polyether ketones.
22. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Flame Retardants of Component (b)

The melamine based flame retardants are for example:
melamine cyanurate,
melamine borate,
melamine phosphates,
melamine polyphosphates,
melamine pyrophosphates,
melamine ammonium polyphosphates and
melamine ammonium pyrophosphates.

Oganohalogen flame retardants are for example:
Chloroalkyl phosphate esters (ANTIBLAZE® AB-100, Albright & Wilson; FYROL® FR-2, Akzo Nobel),
tris(2-chloroethyl)phosphate
polybrominated diphenyl oxide (DE-60F, Great Lakes Corp.),
decabromodiphenyl oxide (DBDPO; SAYTEX® 102E),
tris[3-bromo-2,2-bis(bromomethyl)propyl]phosphate (PB 370®, FMC Corp.),
tris(2,3-dibromopropyl)phosphate
tris(2,3-dichloropropyl)phosphate,
chlorendic acid,
tetrachlorophthalic acid,
tetrabromophthalic acid,
bis-(N,N'-hydroxyethyl)tetrachlorphenylene diamine,
poly-β-chloroethyl triphosponate mixture
bis(2,3-dibromopropyl ether) of tetrabromobisphenol A (PE68),
brominated epoxy resin,
ethylene-bis(tetrabromophthalimide) (SAYTEX® BT-93),
bis(hexachlorocyclopentadieno)cyclooctane (DECLORANE PLUS®),
chlorinated paraffins,
octabromodiphenyl ether,
hexachlorocyclopentadiene derivatives,
1,2-bis(tribromophenoxy)ethane (FF680),
tetrabromo-bisphenol A (SAYTEX® RB100),
ethylene bis-(dibromo-norbornanedicarboximide) (SAYTEX® 451),
bis-(hexachlorocyclopentadieno)cyclooctane,
PTFE
tris-(2,3-dibromopropyl)-isocyanurate, and
ethylene-bis-tetrabromophthalimide.

The phosphorus containing flame retardants are for example:
Tetraphenyl resorcinol diphosphite (FYROLFLEX® RDP, Akzo Nobel),
triphenyl phosphate,
trioctyl phosphate,
tricresyl phosphate,
tetrakis(hydroxymethyl)phosphonium sulfide,
diethyl-N,N-bis(2-hydroxyethyl)-aminomethyl phosphonate,
hydroxyalkyl esters of phosphorus acids,
ammonium polyphosphate (APP) or (HOSTAFLAM® AP750),
resorcinol diphosphate oligomer (RDP),
phosphazene flame retardants,
ethylenediamine diphosphate (EDAP),
phosphonates and their metal salts and
phosphinates and their metal salts.

Boric acid may be included as a further flame retardant.

The halogenated flame retardants useful in the present invention may be selected from organic aromatic halogenated compounds such as halogenated benzenes, biphenyls, phenols, ethers or esters thereof, bisphenols, diphenyloxides, aromatic carboxylic acids or polyacids, anhydrides, amides or imides thereof; organic cycloaliphatic or polycycloaliphatic halogenated compounds; and organic aliphatic halogenated compounds such as halogenated paraffins, oligo- or polymers, alkylphosphates or alkylisocyanurates. These components are largely known in the art, see e.g. U.S. Pat. No. 4,579,906 (e.g. col. 3, lines 30–41), U.S. Pat. No. 5,393,812; see also Plastics Additives Handbook, Ed. by H. Zweifel, 5$^{th}$ Ed., Hanser Publ., Munich 2001, pp. 681–698.

The phosphazene flame retardants are well known in the art. They are disclosed for example in EP1104766, JP07292233, DE19828541, DE1988536, JP11263885, U.S. Pat. Nos. 4,107,108, 4,108,805 and 4,079,035 and 6,265, 599. The relevant disclosures of the U.S. Patents are hereby incorporated by reference.

PTFE, polytetrafluoroethylene (for example Teflon® 6C; E. I. Du Pont), may be advantageously added to the present compositions as an additional flame retardant, as disclosed in U.S. application Ser. No. 60/312,517, filed Aug. 15, 2001.

Component (b) is advantageously contained in the composition of the invention in an amount from about 0.5% to about 45% by weight of the polymer substrate (a); for instance about 3% to about 40%; for example about 5% to about 35% by weight of component (a). For example, component (b) is employed from about 0.5% to about.15% by weight, from about 1% to about 15%, from about 3% to about 15% or from about 5% to about 15% by weight, based on the weight of the polymer substrate. For example, component (b) is employed from about 8% to about 20% or from about 9% to about 20% by weight, based on the weight of the polymer substrate. For example, component (b) is present from about 15% to about 20% by weight, based on the weight of the polymer substrate. For example, component (b) is present at about 15%, 16%, 17%, 18%, 19% or about 20%, based on the weight of the polymer substrate. For example, component (b) is employed from about 0.5% to about 12%, from about 0.5% to about 10%, from about 0.5% to about 8%, or from about 0.5% to about 6% by weight, based on the weight of the polymer substrate.

The ratio (parts by weight) of component (i) to component (ii) is for example between about 100:1 to about 1:100, for instance from about 50:1 to about 1:50, or about 10:1 to about 1:10, or about 5:1 to about 1:5. For example the ratio of component (i) to component (ii) is from about 100:1 to about 1:50, from about 100:1 to about 1:10, or from about 100:1 to about 1:5. For example, the weight ratio of component (i) to component (ii) is from about 1:100 to about 50:1, from about 1:100 to about 10:1, or from about 1:100 to about 5:1. For example, the weight ratio of component (i) to component (ii) is about 1:4, 1:3, 1:2, 1:1, 2:1, 3:1 or 4:1. For example, the weight ratio of component (i) to component (ii) is from about 1:1 to about 1:2.

The amount of component (ii) used also depends on the effectiveness of the specific compound(s), the polymer and the specific application type.

Sterically Hindered Amine Stabilizers

The present hindered amines are for example monomeric compounds or are oligomeric or polymeric compounds.

Hindered alkoxyamine stabilizers are well known in the art, also known as N-alkoxy hindered amines and NOR hindered amines or NOR hindered amine light stabilizers or NOR HALS.

They are disclosed for example in U.S. Pat. Nos. 5,004,770, 5,204,473, 5,096,950, 5,300,544, 5,112,890, 5,124,378, 5,145,893, 5,216,156, 5,844,026, 6,117,995, 6,271,377, 6,392,041, 6,376,584 and 6,472,456 and U.S. application Ser. Nos. 09/714,717, filed Nov. 16, 2000, and 60/312,517, NOR6 1-(2-hydroxy-2-methylpropoxy)-4-oxo-2,2,6,6-tetramethylpiperidine;

NOR7 1-(2-hydroxy-2-methylpropoxy)-4-octadecanoyloxy-2,2,6,6-tetramethylpiperidine;

NOR8 bis(1-(2-hydroxy-2-methylpropoxy)-2,2,6,6-tetramethylpiperidin-4-yl)sebacate;

NOR9 bis(1-(2-hydroxy-2-methylpropoxy)-2,2,6,6-tetramethylpiperidin-4-yl)adipate;

NOR10 2,4-bis{N-[1-(2-hydroxy-2-methylpropoxy)-2,2,6,6-tetramethylpiperidin-4-yl]-N-butylamino}6-(2-hydroxyethylamino)-s-triazine;

NOR11 the reaction product of 2,4-bis[(1-cyclohexyloxy-2,2,6,6-tetramethylpiperidin-4-yl)butylamino]-6-chloro-s-triazine with N,N'-bis(3-aminopropyl)ethylenediamine) [CAS Reg. No. 191680-81-6];

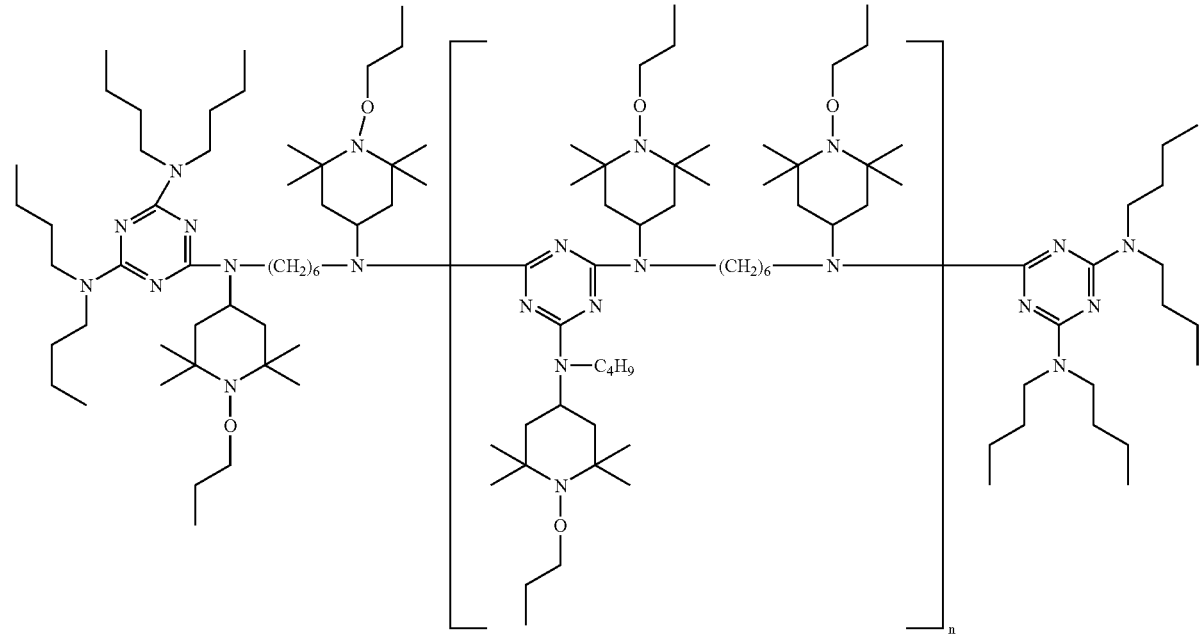

filed Aug. 15, 2001. The relevant disclosures of these patents and applications are hereby incorporated by reference.

U.S. Pat. Nos. 6,271,377, 6,392,041 and 6,376,584 cited above disclose hindered hydroxyalkoxyamine stabilizers. For the purposes of this invention, the hindered hydoxyalkoxyamine stabilizers are considered a subset of the hindered alkoxyamine stabilizers. Hindered hydroxyalkoxyamine stabilizers are also known as N-hydroxyalkoxy hindered amines, or NORol HALS.

Suitable hindered amines according to the present invention include for example:

NOR1 1-cyclohexyloxy-2,2,6,6-tetramethyl4-octadecylaminopiperidine;

NOR2 bis(1-octyloxy-2,2,6,6-tetramethylpiperidin-4-yl) sebacate;

NOR3 2,4-bis[(1-cyclohexyloxy-2,2,6,6-tetramethylpiperidin-4-yl)butylamino]-6-(2-hydroxyethylamino-s-triazine;

NOR4 2,4-bis[(1-cyclohexyloxy-2,2,6,6-tetramethylpiperidin-4-yl)butylamino]-6-chloro-s-triazine;

NOR5 1-(2-hydroxy-2-methylpropoxy)-4-hydroxy-2,2,6,6-tetramethylpiperidine;

in which n is from 1 to 15; and

NOR13 bis(1-cyclohexyloxy-2,2,6,6-tetramethylpiperidin-4-yl)adipate.

Compound NOR12 is disclosed in example 2 of U.S. Pat. No. 6,117,995.

The optional hindered amine stabilizers are advantageously contained in the composition of the invention in an amount from about 0.05% to about 20% by weight based on the polymer substrate (a); for example from about 0.1% to about 10% by weight; for example from about 0.2% to about 8% by weight; for instance from about 0.5% to about 3% by weight. For example, the stabilizers of component (i) are present from about 0.05% to about 15%, from about 0.05% to about 10%, from about 0.05% to about 8%, from about 0.05% to about 5% or from about 0.05% to about 3% by weight based on the weight of substrate (a). For example, the stabilizers of component (i) are present from about 0.1% to about 20%, from about 0.2 to about 20%, from about 0.5 to about 20% or from about 1% to about 20% by weight based on the weight of substrate (a).

The compositions of the present invention are useful for many applications, for example outdoor applications, including the following:
Thermoplastic olefins
Paintable thermoplastic olefins
Polypropylene molded articles
Polyethylene film
Thermoplastic elastomers with other costabilizers
Grease-filled wire and cable insulation
Coatings
Coatings over plastic substrates
Polyolefin tanks or containers containing chemicals
Polyolefin films with an antifog agent
Polyolefin films with IR thermal fillers such as hydrotalcites, e.g. DHT4A
Polyolefin films with an antistatic agent
Flame-resistant molded polypropylene articles
Flame-resistant molded thermoplastic olefins
Flame-resistant polyethylene film
Pre-formed films for lamination to plastic substrates
Electronic appliances
Containers, boxes, bins for storage and transportation
Automotive applications e.g. dashboard, back board
Furniture e.g. stadium seats, public seats
Roofing sheets
Roofing membranes
Flooring materials
Liners
Profiles, for example window and door profiles
Geomembranes
Awning fabrics
Banner films
Upholstery
Drapery
Carpeting
Tents, tarpaulins
Surgical gowns, caps and other hospital applications
Fabrics
Ropes
Nets
Tire cords
Parachutes
Thermoplastic electrical parts (plugs, sockets or wire insulations)

The compositions of the present invention are useful in textile laminates and as coatings of substrates as described in U.S. Pat. Nos. 6,235,658 and 6,251,995, the relevant disclosures of which are hereby incorporated by reference.

The materials containing the stabilizers described herein can be used for the production of moldings, rotomolded articles, injection molded articles, blow molded articles, mono- and multilayer films, extruded profiles, surface coatings and the like.

The compositions of the invention may optionally also contain various conventional additives, for example in amounts from about 0.01 to about 10%, for instance from about 0.025 to about 4%, for example from about 0.1 to about 2% by weight of component (a), such as the materials listed below, or mixtures thereof.

1. Antioxidants 1.1. Alkylated monophenols, for example 2,6-di-tert-butyl4-methylphenol, 2-tert-butyl4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl) phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octade-cyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl4-hydroxyphenyl) disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3, 5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1, 5,5-tetra-(5-tert-butyl-4-hydroxy-2-methylphenyl)pentane.

1.7: O—, N— and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris (3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example diocta-decyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmeraptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxy-phenylpropionyl)trimethylenediamide, N,N'-bis(3,5-di-tert-butyl-4-hydroxyphenylpropionyl)-hydrazide, N,N'-bis[2-(3-[3, 5-di-tert-butyl-4-hydroxyphenyl]propionyloxy)ethyl]oxamide (Naugard® XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octa-decanoylaminophenol, bis(4-methoxyphenyl)amine, 2,6-di-tert-butyl-4-dimethylaminomethyl-phenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-( 1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyidiphenylamines, 2,3-dihydro-3,3-dimethyl4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilizers 2.1. 2-(2-Hydroxyphenyl)-2H-benzotriazoles, for example known commercial hydroxyphenyl-2H-benzotriazoles and benzotriazoles as disclosed in, U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905, 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218 such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl- 2-hydroxy-5-(2-(ω-hydroxy-octa-(ethyleneoxy)carbonylethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylpheny)-2H-benzotriazole, 5-chloro-2-(2-hydroxy-3,5-di--cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotri 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tertbutylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethyl-butyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl4-piperidyl)succinate, bis(1,2,2,6,6-pentamethyl4-piperidyl)sebacate, bis(1-octyloxy-2,2,6,6-tetramethyl-4-piperidyl)sebacate, bis(1,2,2,6,6-pentamethyl-4-piperidyl)n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris (2,2,6,6-tetramethyl4-piperidyl)nitrilotriacetate, tetrakis(2,2,6,6-tetramethyl4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethyl-piperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decan-2,4-dione, bis (1-octyloxy-2,2,6,6-tetramethylpiperidyl)sebacate, bis(1-octyloxy-2,2,6,6-tetramethylpiperidyl)succinate, linear or cyclic condensates of N,N'-bis-(2,2,6,6-tetramethyl4-piperidyl)hexamethylenediamine and 4-morpholino-2,6-dichloro-1,3,5-triazine, the condensate of 2-chloro4,6-bis(4-n-butylamino-2,2,6,6-tetramethylpiperidyl)-1,3,5-triazine and 1,2-bis(3-aminopropylamino)ethane, the condensate of 2-chloro4,6-di-(4-n-butylamino-1,2,2,6,6-pentamethylpiperidyl)-1,3,5-triazine and 1,2-bis-(3-aminopropylamino) ethane, 8-acetyl-3-dodecyl-7,7,9,9-tetramethyl-1,3,8-triazaspiro[4.5]decane-2,4-dione, 3-dodecyl-1-(2,2,6,6-tetramethyl4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro[4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy4-(2,2,6,6-tetramethyl-4-piperidyl)]siloxane, reaction product of maleic acid anhydride-α-olefincopolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. Tris-aryl-o-hydroxyphenyl-s-triazines, for example known commercial tris-aryl-o-hydroxyphenyl-s-triazines and triazines as disclosed in, WO 96/28431 and U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,736,597; 5,942,626; 5,959,008; 5,998,116; 6,013,704; 6,060,543; 6,187,919; 6,242,598 and 6,255,483, for example 4,6-bis-(2,4-dimethylphenyl)-2-(2- hydroxy-4-octyloxyphenyl)-s-triazine, Cyasorb® 1164, Cytec Corp, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxyethoxy)phenyl]-6-(4-chlorophenyl)-s-triazine, 2,4-bis[2-hydroxy-4-(2-hydroxy-4-(2-hydroxyethoxy)phenyl]-6-(2,4-dimethylphenyl)-s-triazine, 2,4-bis[2-hydroxy4-(2-hydroxyethoxy)phenyl]-6-(4-bromophenyl)-s-triazine, 2,4-bis[2-hydroxy4-(2-acetoxyethoxy)-phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl]-6-[2-hydroxy4-(3-sec-amyloxy-2-hydroxypropyloxy)phenyl]-s-triazine, 2,4-bis(2,4-dimethylphenyl)-6-[2-hydroxy-4-(3-benzyloxy-2-hydroxypropyloxy)phenyl]-s-triazine, 2,4-bis(2-hydroxy4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonylisopropylideneoxy-phenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl]-s-triazine, mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, Tinuvin® 400, Ciba Specialty Chemicals Corp., 4,6-bis-(2,4-dimethylphenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butyl-phenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis (2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

Specific examples are the following phosphites:

Tris(2,4-di-tert-butylphenyl)phosphite (Irgafos® 168, Ciba-Geigy), tris(nonylphenyl)phosphite,

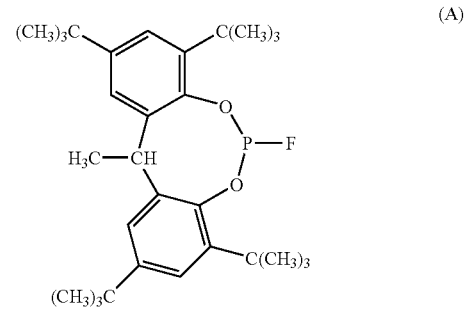

(A)

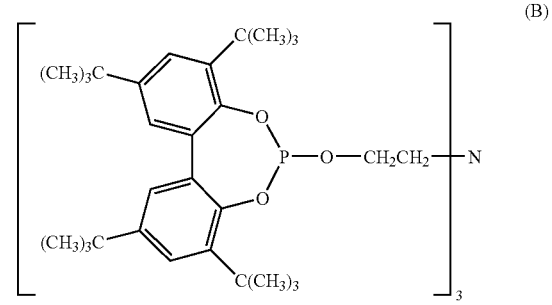

(B)

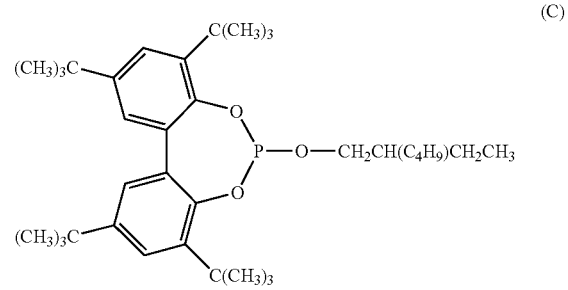

(C)

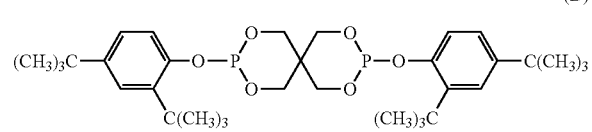

(D)

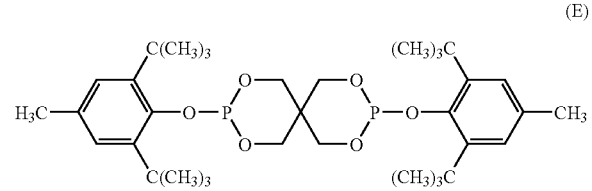

(E)

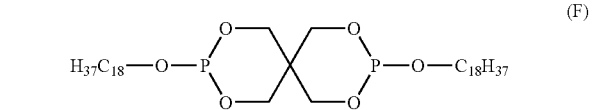

(F)

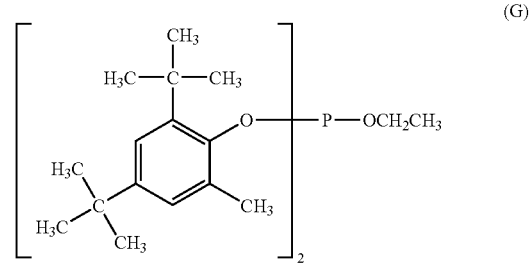

(G)

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercapto-benzimidazole, zinc dibutyldithiocarbamate, dioctadecyl disulfide, pentaerythritol tetrakis(β-dodecylmercapto)propionate.

9. Polyamide stabilizers, for example, copper salts in combination with iodides and/or phosphorus compounds and salts of divalent manganese.

10. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zinc pyrocatecholate.

11. Nucleating agents, for example, inorganic substances such as talcum, metal oxides such as titanium dioxide or magnesium oxide, phosphates, carbonates or sulfates of, for example, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers). Specific examples are 1,3:2,4-bis(3',4'-dimethylbenzylidene)sorbitol, 1,3:2,4-di(paramethyldibenzylidene)sorbitol, und 1,3:2,4-di(benzylidene)sorbitol.

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

15. Amine oxides, for example amine oxide derivatives as disclosed in U.S. Pat. Nos. 5,844,029 and 5,880,191, didecyl methyl amine oxide, tridecyl amine oxide, tridodecyl amine oxide and trihexadecyl amine oxide. U.S. Pat. Nos. 5,844,029 and 5,880,191 disclose the use of saturated hydrocarbon amine oxides towards the stabilization of thermoplastic resins. It is disclosed that the thermoplastic compositions may further contain a stabilizer or mixture of stabilizers selected from phenolic antioxidants, hindered amine light stabilizers, ultraviolet light absorbers, organic phosphorus compounds, alkaline metal salts of fatty acids and thiosynergists. The co-use of amine oxides with other stabilizers towards stabilizing polyolefins is not exemplified.

Specific examples of additives are phenolic antioxidants (item 1 of the list), further sterically hindered amines (item 2.6 of the list), light stabilizers of the benzotriazole and/or o-hydroxyphenyltriazine class (items 2.1 and 2.8 of the list), phosphites and phosphonites (item 4 of the list) and peroxide-destroying compounds (item 5. ) of the list.

Additional specific examples of additives (stabilizers) which are benzofuran-2-ones, such as described, for example, in U.S. Pat. Nos. 4,325,863, 4,338,244 or 5,175,312.

The instant composition can additionally contain another UV absorber selected from the group consisting of the s-triazines, the oxanilides, the hydroxybenzophenones, benzoates and the α-cyanoacrylates. Particularly, the instant composition may additionally contain an effective stabilizing amount of at least one other 2-hydroxyphenyl-2H-benzotriazole; another tris-aryl-s-triazine; or hindered amine or mixtures thereof. For example, additional components are selected from pigments, dyes, plasticizers, antioxidants, thixotropic agents, levelling assistants, basic costabilizers, further light stabilizers like UV absorbers and/or sterically hindered amines, metal passivators, metal oxides, organophosphorus compounds, hydroxylamines, and mixtures thereof, especially pigments, phenolic antioxidants, calcium stearate, zinc stearate, UV absorbers of the 2-(2'-hydroxyphenyl)benzotriazole and 2-(2-hydroxyphenyl)-1,3,5-triazine classes, and sterically hindered amines.

The additives of the invention and optional further components may be added to the polymer material individually or mixed with one another. If desired, the individual components can be mixed with one another before incorporation into the polymer for example by dry blending, compaction or in the melt. Subject of the invention therefore is also a flame retardant additive combination comprising (i) at least one melamine based flame retardant and
(ii) at least one flame retardant selected from the group consisting of the organohalogen and the phosphorus containing flame retardants.

Conveniently, the additives of above components (i) and (ii) and possibly further additives as described above may be dry blended and then extruded, for instance in a twin screw extruder at 180–220° C., with or without nitrogen atmosphere. The material thus obtained may be further processed according to known methods. The surface of the articles formed do not show any loss of gloss or any kind of roughness.

Further, the instant invention pertains to a process for imparting flame retardancy to an organic polymer substrate, which process comprises adding to said polymer substrate an effective flame retarding amount of a mixture of (i) at least one melamine based flame retardant and
(ii) at least one flame retardant selected from the group consisting of the organohalogen and the phosphorus containing flame retardants.

The incorporation of the additives of the invention and optional further components into the polymer is carried out by known methods such as dry blending in the form of a powder, or wet mixing in the form of solutions, dispersions or suspensions for example in an inert solvent, water or oil. The additives of the invention and optional further additives may be incorporated, for example, before or after molding or also by applying the dissolved or dispersed additive or additive mixture to the polymer material, with or without subsequent evaporation of the solvent or the suspension/dispersion agent. They may be added directly into the processing apparatus (e.g. extruders, internal mixers, etc), e.g. as a dry mixture or powder or as solution or dispersion or suspension or melt.

The incorporation can be carried out in any heatable container equipped with a stirrer, e.g. in a closed apparatus such as a kneader, mixer or stirred vessel. The incorporation is for example carried out in an extruder or in a kneader. It is immaterial whether processing takes place in an inert atmosphere or in the presence of oxygen.

The addition of the additive or additive blend to the polymer can be carried out in all customary mixing machines in which the polymer is melted and mixed with the additives. Suitable machines are known to those skilled in the art. They are predominantly mixers, kneaders and extruders.

The process is for instance carried out in an extruder by introducing the additive during processing.

Specific examples of suitable processing machines are single-screw extruders, contrarotating and corotating twin-screw extruders, planetary-gear extruders, ring extruders or cokneaders. It is also possible to use processing machines provided with at least one gas removal compartment to which a vacuum can be applied.

Suitable extruders and kneaders are described, for example, in *Handbuch der Kunststoffextrusion*, Vol. 1 Grundlagen, Editors F. Hensen, W Knappe, H. Potente, 1989, pp. 3–7, ISBN:3-446-14339-4 (Vol. 2 *Extrusionsanlagen* 1986, ISBN 3-446-14329-7).

For example, the screw length is 1–60 screw diameters, for example 35–48 screw diameters. The rotational speed of the screw is for instance 10–600 rotations per minute (rpm), for example 25–300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components are added, these can be premixed or added individually.

The additives of the invention and optional further additives can also be sprayed onto the polymer material. They are able to dilute other additives (for example the conventional additives indicated above) or their melts so that they can be sprayed also together with these additives onto the material. Addition by spraying during the deactivation of the polymerization catalysts is particularly advantageous; in this case, the steam evolved may be used for deactivation of the catalyst. In the case of spherically polymerized polyolefins it may, for example, be advantageous to apply the additives of the invention, optionally together with other additives, by spraying.

The additives of the invention and optional further additives can also be added to the polymer in the form of a masterbatch ("concentrate") which contains the components in a concentration of, for example, about 1% to about 40%, for example about 2% to, about 20% by weight incorporated in a polymer. The polymer must not be necessarily of identical structure than the polymer where the additives are added finally. In such operations, the polymer can be used in the form of powder, granules, solutions, suspensions or in the form of latices.

Incorporation can take place prior to or during the shaping operation. The materials containing the additives of the invention described herein are for example used for the production of molded articles, for example rotomolded articles, injection molded articles, profiles and the like. Thus, a molded polymer article made flame retardant by the incorporation of (i) at least one melamine based flame retardant and
(ii) at least one flame retardant selected from the group consisting of the organohalogen and the phosphorus containing flame retardants is another object of the invention.

It is also contemplated that PTFE, polytetrafluoroethylene (for example Teflon® 6C; E. I. Du Pont), may be advantageously added to the present compositions as an additional flame retardant, as disclosed in U.S. application Ser. No. 60/312,517, filed Aug. 15, 2001.

The polyolefin molded articles of this invention may be used for example as roofing membranes, siding, window profiles and moldings. Such molded articles are for example about 5 mil to about 100 mil thick, for example about 20 mil to about 100 mil thick, for instance about 10 mil to about 80 mil for example about 40 mil to about 100 mil thick. The polyolefin is in particular thermoplastic olefin (TPO).

The effective flame retarding amount of component (b) is that needed to show flame retarding efficacy as measured by one of the standard methods used to assess flame retardancy. These include UL 1694 Tests for Flammability of Small Polymeric Component Materials, 2002; NFPA 701 Standard Methods of Fire Tests for Flame-Resistant Textiles and Films, 1989 and 1996 and 1999 editions; the UL 94 Test for Flammability of Plastic Materials for Parts in Devices and Appliances, 5th Edition, Oct. 29, 1996; Limiting Oxygen Index (LOI), ASTM D-2863; and Cone Calorimetry, ASTM E-1354. Ratings according to the UL 94 V test are as compiled in the following table:

| Rating | Afterflame time | Burning drips | Burn to Clamp |
|---|---|---|---|
| V-0 | <10 s | no | no |
| V-1 | <30 s | no | no |
| V-2 | <30 s | yes | no |
| Fail | <30 s |  | yes |
| Fail | >30 s |  | no |

Coadditives found particularly useful for use with the instant combination of components (i) and (ii) in flame retardant compositions are as follows:

UV Absorbers:
2-(2-hydroxy-3,5-di-α-cumylphenyl)-2H-benzotriazole, (TINUVIN® 234, Ciba Specialty Chemicals Corp.);
2-(2-hydroxy-5-methylphenyl)-2H-benzotriazole; (TINUVIN® P, Ciba Specialty Chemicals Corp.);

5-chloro-2-(2-hydroxy-3,5-di-tert-butylphenyl)-2H-benzotriazole, (TINUVIN® 327, Ciba Specialty Chemicals Corp.);

2-(2-hydroxy-3,5-di-tert-amylphenyl)-2H-benzotriazole, (TINUVIN® 328, Ciba Specialty Chemicals Corp.);

2-(2-hydroxy-3α-cumyl-5-tert-octylphenyl)-2H-benzotriazole, (TINUVIN® 928, Ciba Specialty Chemicals Corp.);

2,4-di-tert-butylphenyl 3,5-di-tert-butyl-4-hydroxybenzoate, (TINUVIN® 120, Ciba Specialty Chemicals Corp.);

2-hydroxy-4-n-octyloxybenzophenone, (CHIMASSORB® 81, Ciba Specialty Chemicals Corp.);

2,4-bis(2,4-dimethyphenyl)-6-(2-hydroxy-4-octyloxyphenyl)-s-triazine, (CYASORB® 1164, Cytec).

The following examples are meant for illustrative purposes only and are not to be construed to limit the scope of this invention in any manner whatsoever. Where given, room temperature depicts a temperature in the range 20–25° C. Percentages are by weight of the polymer substrate unless otherwise indicated.

Abbreviations:

| | |
|---|---|
| v | parts by volume |
| w | parts by weight |
| $^1$Hnmr | nuclear magnetic resonance (NMR) of $^1$H |
| m/z | mass spectrometry (atomic units) |
| amu | molecular weight in g/mol (= atomic units) |
| PP | polypropylene |
| PE | polyethylene |
| PE-LD | low density polyethylene (LDPE) |

Test Methods

NFPA 701 Standard Methods of Fire Tests for Flame-Resistant Textiles and Films, 1989 and 1996 editions;

UL 1694 Tests for Flammability of Small Polymeric Component Materials, 2002;

UL 94 Test for Flammability of Plastic Materials for Parts in Devices and Appliances, 5th Edition, Oct. 29, 1996;

Limiting Oxygen Index (LOI), ASTM D-2863;

Cone Calorimetry, ASTM E-1 or ASTM E 1354;

ASTM D 2633-82, burn test.

Test Compounds

Melamine based flame retardants of component (i):
melamine cyanurate, MELAPUR® MC,
melamine borate,
melamine phosphate, MELAPUR® P 46,
melamine polyphosphate MELAPUR® 200,
melamine pyrophosphate,
melamine ammonium polyphosphate and
melamine ammonium pyrophosphate.

Flame retardants of component (ii):

FR1 tris[3-bromo-2,2-bis(bromomethyl)propyl]phosphate, (PB 370®, FMC Corp.),

FR2 ammonium polyphosphate (APP),

FR3 bis(2,3-dibropropyl)ether of tetrabromobisphenol A (PE68),

FR4 ammonium polyphosphate/synergist blend, HOSTAFLAM® AP750,

FR5 decabromodiphenyl oxide (DBDPO; obtained from Dead Sea Bromine),

FR6 ethylene bis-(tetrabromophthalimide), (SAYTEX® BT-93),

FR7 ammonium polyphosphate, EXOLIT® AP752,

FR8 tris-(2,3-dibromopropyl)-isocyanurate,

FR9 hexabromocyclododecane,

Hindered Amines:

NOR1 1-cyclohexyloxy-2,2,6,6-tetramethyl-4-octadecylaminopiperidine;

NOR2 bis(1-octyloxy-2,2,6,6-tetramethylpiperidin-4-yl)sebacate;

NOR3 2,4-bis[(1-cyclohexyloxy-2,2,6,6-tetramethylpiperidin-4-yl)butylamino]-6-(2-hydroxyethylamino-s-triazine;

NOR4 2,4-bis[(1-cyclohexyloxy-2,2,6,6-tetramethylpiperidin-4-yl)butylamino]-6-chloro-s-triazine;

NOR5 1-(2-hydroxy-2-methylpropoxy)-4-hydroxy-2,2,6,6-tetramethylpiperidine;

NOR6 1-(2-hydroxy-2-methylpropoxy)-4-oxo-2,2,6,6-tetramethylpiperidine;

NOR7 1-(2-hydroxy-2-methylpropoxy)-4-octadecanoyloxy-2,2,6,6-tetramethylpiperidine;

NOR8 bis(1-(2-hydroxy-2-methylpropoxy)-2,2,6,6-tetramethylpiperidin-4-yl)sebacate;

NOR9 bis(1-(2-hydroxy-2-methylpropoxy)-2,2,6,6-tetramethylpiperidin-4-yl)adipate;

NOR10 2,4-bis{N-[1-(2-hydroxy-2-methylpropoxy)-2,2,6,6-tetramethylpiperidin-4-yl]-N-butylamino}-6-(2-hydroxyethylamino)-s-triazine;

NOR11 the reaction product of 2,4-bis[(1-cyclohexyloxy-2,2,6,6-tetrmethylpiperidin-4-yl)butylamino]-6-chloro-s-triazine with N,N'-bis(3-aminopropyl)ethylenediamine) [CAS Reg. No. 191680-81-6];

NOR11 is represented as a mixture of compounds with main component of the formula

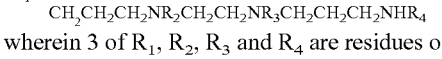

wherein 3 of $R_1$, $R_2$, $R_3$ and $R_4$ are residues of formula

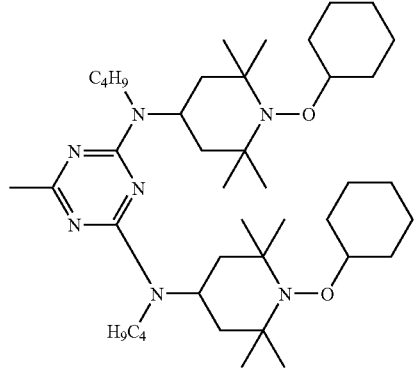

and 1 of $R_1$, $R_2$, $R_3$ and $R_4$ is hydrogen (NOR11 is a high molecolar weight compound disclosed in example 3 of U.S. Pat. No. 5,844,026);

NOR12 the compound of formula

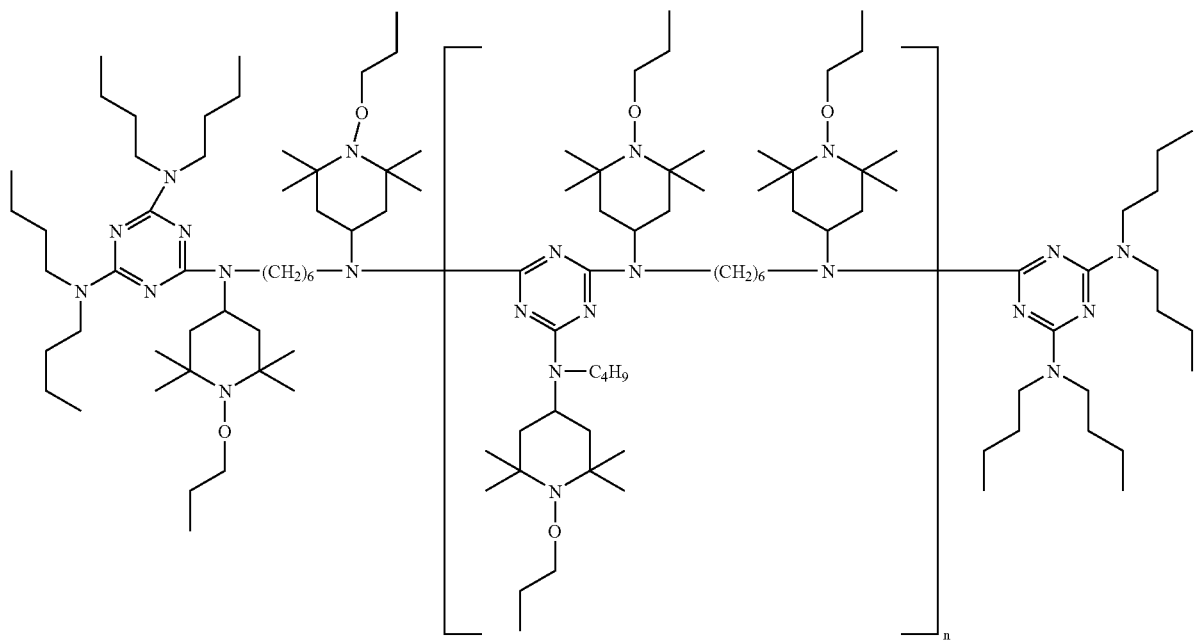

in which n is from 1 to 15; and

NOR13 bis(1-cyclohexyloxy-2,2,6,6-tetramethylpiperidin-4-yl) adipate.

Compounds NOR2, NOR7, NOR11, NOR12 are commercial stabilizers available from Ciba Specialty Chemicals. MELAPUR products are available from Ciba Specialty Chemicals.

EXAMPLE 1

Flame Retardant Polypropylene

Additives are dry mixed and extruded with polypropylene homopolymer resin with a twin screw (27 mm) extruder at 200° C. under nitrogen. From the pellets, 1.6 mm plaques are prepared by injection molding. The plaques are tested according to UL 94 protocol after 48 hours conditioning at 25° C. and 50% humidity and also after 7 days at 70° C. UL 94 ratings are the same for both exposures. The plaques are also tested according to UL 1694 protocol after 48 hours at 25° C. and 50% humidity and also after 24 hours at 70° C. UL 1694 ratings are the same for both exposures. Weight percent of additives and flame retardant results are in the table below. Weight percents are based on the polymer.

| melamine cyanurate | FR3 | $Sb_2O_3$ | UL 94 rating | UL 1694 rating |
|---|---|---|---|---|
| — | 8 | 3 | V-0 | fail |
| — | 4 | 2 | V-2 | fail |
| 4 | 8 | 3 | V-0 | pass |
| 6 | 6 | 2 | V-0 | pass |
| 8 | 4 | 2 | V-0 | fail |

The additional inclusion of a hindered amine selected from NOR1–NOR13 provides further flame retardancy as well as light stability.

Melamine cyanurate may be replaced with a flame retardant selected from the group consisting of melamine borate, melamine phosphate, melamine polyphosphate, melamine pyrophosphate, melamine ammonium polyphosphate and melamine ammonium pyrophosphate with good results.

FR1 and FR3 may be replaced with another flame retardant selected from FR1–FR9 with good results.

EXAMPLE 2

Polypropylene-Ethylene Copolymer

Sample preparation: Polymer powder and stabilizers are pre-mixed (Henschel mixer, 800 rpm, room temperature), pigment powder and flame retardant are added as concentrate in PP and homogenized in a drum mixer. Further homogenization and granulation is achieved by extrusion (Collin® twin screw extruder, max 200° C., 100 rpm). Subsequently, the mixture is processed into a flat film by means of a single screw extruder (max 200° C., 70 rpm) equipped with a corresponding nozzle (sample dimension 2 mm thickness, 10 cm width).

Weathering: Punched samples are exposed to accelerated weathering (Atlas® WOM Ci 65, 0.35 W/m² (at 340 nm), 102 min dry, 18 min water spray, 63° C. black panel temperature. The effect of weathering on the surface is assessed in the following manner:

Visual inspection of chalking (chalking indicates decomposition on the surface).

Gloss: Minolta; degradation of surface reduces the reflection of polarized light (60° gloss as defined in DIN 67530).

Δ E: Color change (according to DIN 6174).

Formulation:

84 parts by weight of polypropylene-ethylene copolymer (Novolen® PPG 1022), 15 parts by weight of a PE-based flame retardant masterbatch containing 51% by weight of a 1:1 mixture of FR1 and melamine cyanurate 1 part by weight of $TiO_2$ and 0.2 parts by weight of blue pigment (Cromophtal blue 4GNP)

Excellent flame retardant results are obtained.

Melamine cyanurate may be replaced with a flame retardant selected from the group consisting of melamine borate, melamine phosphate, melamine polyphosphate, melamine pyrophosphate, melamine ammonium polyphosphate and melamine ammonium pyrophosphate with good results.

FR1 may be replaced with another flame retardant selected from FR1–FR9 with good results.

EXAMPLE 3

TPO Roofing Membranes

The polyolefin molded articles of this invention may be used for example as roofing membranes, siding, window profiles and moldings. Such molded articles are for example about 5 mil to about 100 mil thick. The polyolefin is in particlular thermoplastic polyolefin (TPO). The molded articles of this invention exhibit flame retardant properties.

A typical state of the art formulation for such applications is for example:

|  | parts |
|---|---|
| Polypropylene copolymer | 100 |
| TiO$_2$ or carbon black | 3 |
| CaCo$_3$ | 5 |
| Magnesium hydroxide | 35 |
| UV stabilizer | 1 |
| Lubricant or other | 1 |

The state of the art formulation requires that either TiO$_2$ or carbon black are present and that magnesium hydroxide is present.

The formulation of the present invention is for example:

|  | parts |
|---|---|
| Polypropylene copolymer | 100 |
| TiO$_2$ or carbon black | 3 |
| CaCO$_3$ | 0–5 |
| Magnesium hydroxide | 0 |
| NOR7 | 1.0 |
| FR1 | 4 |
| melamine cyanurate | 6 |
| UV stabilizer | 1 |
| Present acid scavenger | 1 |

NOR7 may be replaced for example with another hindered amine selected from NOR1–NOR13. FR1 may be replaced with a flame retardant selected from FR2–FR9. Excellent results are achieved.

Melamine cyanurate may be replaced with a flame retardant selected from the group consisting of melamine borate, melamine phosphate, melamine polyphosphate, melamine ammonium polyphosphate, melamine ammonium pyrophosphate and melamine pyrophosphate with good results.

EXAMPLE 4

Polyethylene fibers are prepared from fiber grade polyethylene by dry blending with test additives and melt compounding at 400° F. Fibers are extruded from this formulation using a Hills laboratory scale fiber extruder. Socks are knitted from the fibers and are tested for flame retardancy according to NFPA 701 vertical burn method. Polyethylene fibers contain 12% by weight of a 1:1 mixture of a melamine based flame retardant and a flame retardant selected from FR1–FR9 and 0.5%, 1% or 2% by weight, total, of an additive selected from NOR1–NOR13. These formulated fibers are tested for flame retardancy according to NFPA 701.

The fibers containing a melamine based flame retardant, and a flame retardant selected from FR1–FR9 exhibit excellent flame retardancy.

EXAMPLE 5

Foam grade polyethylene is dry blended with test additives and then melt compounded into pellets. The pelletized fully formulated resin is then blown into foam.

The polyethylene foam prepared contains an instant additive selected from the melamine based flame retardants and a flame retardant FR1–FR9. The formulated foam is tested for flame retardancy according to the UL-94 burn test method.

The foam containing a melamine based flame retardant and a flame retardant selected from FR114 FR9 exhibits excellent flame retardancy.

EXAMPLE 6

Wire & cable grade polyethylene is dry blended with test additives and then melt compounded into pellets. The pelletized fully formulated resin is then extruded onto wire.

Test specimens are tested for flame retardancy using the ASTM D 2633-82 burn test conditions. The formulations containing a melamine based flame retardant, a flame retardant selected from FR1–FR9 and optionally a compound selected from NOR1–NOR13 exhibit excellent flame retardancy.

EXAMPLE 7

Fiber grade polyethylene is dry-blended with test additives. Non-woven fabrics are produced from the polymer blend formulations by a spun-bonded or melt-blown process.

The non-woven fabrics made thereby are tested for flame retardancy according to the NFPA 701 vertical burn test specifications. The fabrics containing a melamine based flame retardant and a flame retardant selected from FR1–FR9 exhibit excellent flame retardancy.

EXAMPLE 8

Fiber grade polypropylene is dry-blended with test additives. Non-woven fabrics are produced from the polymer blend formulations by a spun-bonded or melt-blown process.

The non-woven fabrics made thereby are tested for flame retardancy according to the NFPA 701 vertical burn test specifications. The fabrics containing a melamine based flame retardant and a flame retardant selected from FR1–FR9 exhibit excellent flame retardancy.

EXAMPLE 9

Molding grade polystyrene is dry-blended with test additives and then melt compounded. Specimens are injection molded from these test formulations.

The specimens are tested for flame retardancy according to the UL-94 burn test specifications. The molded specimens containing a melamine based flame retardant and a flame retardant selected from FR1–FR9 exhibit excellent flame retardancy.

EXAMPLE 10

Foam grade polystyrene is dry-blended with test additives and then melt compounded. Foam polystyrene-specimens are prepared from these test formulations.

The specimens are tested for flame retardancy according to the UL-94 burn test specifications. The foam specimens containing a melamine based flame retardant and a flame retardant selected from FR1–FR9 exhibit excellent flame retardancy.

EXAMPLE 11

Molding grade ABS is dry blended with test additives and then melt compounded at 425° F. (218° C.). Specimens 125 mil (⅛") thick are then injection molded from this formulation using a Boy Injection Molder at 450° F. (232° C.). The specimens are tested for flame retardancy according to the UL-94 vertical burn test specifications.

The specimens containing a melamine based flame retardant and a flame retardant selected from FR1–FR9 exhibit excellent flame retardancy.

EXAMPLE 12

Fiber grade polypropylene is dry blended with test additives and then melt compounded at 234° C. (450° F.) into pellets. The pelletized fully formulated resin is then spun at 246° C. (475° F.) into fiber using a Hills laboratory model fiber extruder. The spun tow of 41 filaments is stretched at a ratio of 1:3.2 to give a final denier of 615/41.

Socks are knitted from the stabilized polypropylene fiber on a Lawson-Hemphill-Analysis Knitter and tested under NFPA 701 vertical burn procedure. The time in seconds for the knitted sock to extinguish after the insult flame is removed is reported as "After Flame". Both the maximum time for any one replicate and the total time for ten replicates are measured. Efficacy as a flame retardant is demonstrated when low After Flame times are observed relative to a blank sample containing no flame retardant.

The specimens containing a melamine based flame retardant and a flame retardant selected from FR1–FR9 exhibit excellent flame retardancy.

EXAMPLE 13

Film grade polyethylene is dry blended with test additives and then melt compounded into pellets. The pelletized fully formulated resin is then blown at 205° C. using a MPM Superior Blown film extruder.

The films are tested for flame retardancy under NFPA 701 test conditions. The specimens containing a melamine based flame retardant and a flame retardant selected from FR1–FR9 exhibit excellent flame retardancy.

Film grade polypropylene is handled in a similar fashion and polypropylene films containing the present additive combinations also show excellent flame retardancy.

EXAMPLE 14

Molded test specimens are prepared by injection molding thermoplastic olefin (TPO) pellets containing a present additive combination. The TPO formulations may also contain a pigment, a phosphite; a phenolic antioxidant or hydroxylamine, a metal stearate, a UV absorber or a hindered amine stabilizer or a mixture of hindered amine and UV absorber.

Pigmented TPO formulation composed of polypropylene blended with a rubber modifier where the rubber modifier is an in-situ reacted copolymer or blended product containing copolymers of propylene and ethylene with or without a ternary component such as ethylidene norbornene are stabilized with a base stabilization system consisting of an N,N-dialkylhydroxyl-amine or a mixture of hindered phenolic antioxidant and an organophosphorus compound.

The TPO plaques are tested for flame retardancy using the UL-94 Vertical Burn conditions. A minimum of three replicates are tested. Efficacy as a flame retardant is measured relative to a blank sample containing no flame retardant.

The specimens containing a melamine based flame retardant and a flame retardant selected from FR1–FR9 exhibit excellent flame retardancy.

EXAMPLE 15

Film grade ethylene/vinyl acetate (EVA) copolymers containing 20 weight percent or less of vinyl acetate are dry blended with test additives and then melt compounded into pellets. The pelletized fully formulated resin is then blown into a film at 205° C. using a MPM Superior Blown-film extruder.

The films are tested for flame retardancy under NFPA 701 test conditions. The films containing a melamine based flame retardant and a flame retardant selected from FR1–FR9 exhibit excellent flame retardancy.

Film grade low density polyethylene (LDPE) which contains some linear low density polyethylene (LLDPE) and/or ethylene/vinyl acetate (EVA) are dry blended with test additives and blown into film as described above for EVA copolymer resin. The films are tested for flame retardancy under NFPA 701 test conditions and those containing a melamine based flame retardant and a flame retardant selected from FR1–FR9 exhibit excellent flame retardancy.

EXAMPLE 16

High impact polystyrene (HIPS) polymer (STYRON® 484C, Dow Chemical Co.) is compounded with test additives, pelletized and then injection or compression molded into plaques. These plaques are tested for flame retardant efficacy using cone calorimetry, LOI or UL-94 test method.

The fabrics containing a melamine based flame retardant and a flame retardant selected from FR1–FR9 exhibit excellent flame retardancy. Flame retardant HIPS polymers find application in housings for business machines.

EXAMPLE 17

This Example shows the efficacy of the present compound combinations in PVC formulations. Such formulations are useful in flexible or rigid PVC and in wire and cable applications.

Typical formulations are seen below:

| Component | parts | parts | parts | parts |
|---|---|---|---|---|
| PVC resin | 100 | 100 | 100 | 100 |
| tin mercaptide | 1.5 | — | 2.0 | — |

-continued

| Component | parts | parts | parts | parts |
|---|---|---|---|---|
| tin carboxyate | — | 2.5 | — | 2.0 |
| process aid | 1.5 | 1.5 | 2.0 | 2.0 |
| impact mod. | 6.0 | 6.0 | 7.0 | 7.0 |
| paraffin wax | 1.0 | 0.3 | 1.0 | 1.0 |
| polyethyl wax | 0.1 | 0.1 | 0.2 | 0.2 |
| Ca stearate | 1.0 | — | 0.8 | — |
| pigment | 1.0 | 0.9 | 5.0 | 5.0 |

Fully formulated PVC containing a melamine based flame retardant and a flame retardant selected from FR1–FR9 is pelletized and then injection molded into test plaques for examination of flame retardancy using the UL-94 or LOI test method.

The PVC plaques containing the instant compound combinations demonstrate excellent flame retardancy.

EXAMPLE 18

Fiber grade poly(ethylene terephthalate) (PET) is dry blended with test additives, then melt compounded at 550° F. and then pelletized. The polyester pellets are dried at 175° F. for 24 hours under vacuum. The dried pellets are extruded into fibers using a Hills laboratory scale fiber extruder at 550° F. Socks are knitted from these fibers and tested for flame retardancy according to NFPA 701 test method.

The fibers containing a melamine based flame retardant and a flame retardant selected from FR1–FR9 exhibit excellent flame retardancy.

EXAMPLE 19

Thermoplastic resins including polypropylene, polyethylene homopolymer, polyolefin copolymer or thermoplastic olefins (TPO), high impact polystyrene (HIPS) and ABS are dry blended with test additives and then melt compounded into pellets. The pelletized fully formulated resin is then processed into a useful article such as extrusion into fiber; blown or cast extrusion into film; blow molded into bottles; injection molded into molded articles, thermoformed into molded articles, extruded into wire and cable housing or rotation molded into hollow articles.

The articles containing a melamine based flame retardant and a flame retardant selected from FR1–FR9 exhibit excellent flame retardancy when tested by a known standard test method.

Polyethylene wire and cable applications are tested for flame retardancy according to ASTM D-2633-82 burn test method. The materials containing a melamine based flame retardant and a flame retardant selected from FR1–FR9 exhibit excellent flame retardancy.

EXAMPLE 20

Articles prepared according to Example 19 which additionally contain an organophosphorus stabilizer selected from the group consisting of tris(2,4-di-tert-butylphenyl) phosphite, bis(2,4-di-tert-butyl-6-methylphenyl)ethyl phosphite, 2,2',2"-nitrilo[triethyl-tris-(3,3',5,5'-tetra-tert-butyl-1,1'-biphenyl-2,2'-diyl)phosphite], tetrakis(2,4-di-tert-butylphenyl) 4,4'-biphenylenediphosphonite, tris(nonylphenyl) phosphite, bis(2,4-di-tert-butylphenyl) pentaerythrityl diphosphite, 2,2'-ethylidenebis(2,4-di-tert-butylphenyl) fluorophosphite and 2-butyl-2-ethylpropan-1,3-diyl 2,4,6-tri-tert-butylphenyl phosphite exhibit good flame retardancy properties.

EXAMPLE 21

Articles prepared according to Example 19 which additionally contain a o-hydroxy-phenyl-2H-benzotriazole, a hydroxyphenyl benzophenone or a o-hydroxyphenyl-s-triazine UV absorber selected from the group consisting of 2-(2-hydroxy-3,5-di-α-cumylphenyl)-2H-benzotriazole, 2-(2-hydroxy-5-methylphenyl)-2H-benzotriazole, 5-chloro-2-(2-hydroxy-3,5-di-tert-butyl-phenyl)-2H-benzotriazole, 2-(2-hydroxy-3,5-di-tert-amylphenyl)-2H-benzotriazole, 2-(2-hydroxy-3-α-cumyl-5-tert-octylphenyl)-2H-benzotriazole, 2,4-di-tert-butylphenyl 3,5-di-tert-butyl-4-hydroxybenzoate, 2-hydroxy-4-n-octyloxybenzophenone and 2,4-bis(2,4-dimethyphenyl)-6-(2-hydroxy-4-octyloxyphenyl)-s-triazine exhibit good flame retardancy.

EXAMPLE 22

Polypropylene Electrical Insulation

Polypropylene homopolymer samples are prepared.

The samples containing a melamine based flame retardant and a flame retardant selected from FR1–FR9 exhibit excellent flame retardancy when tested by a known standard test method.

Test method UL 1694, Tests for Flammability of Small Polymeric Component Materials, is relevant for this application.

EXAMPLE 23

Polyethylene Electrical Parts

Polyethylene electrical parts, HDPE and LDPE, are prepared.

The parts containing a melamine based flame retardant and a flame retardant selected from FR1–FR9 exhibit excellent flame retardancy when tested by a known standard test method.

Test method NFPA 701 is relevant.

EXAMPLE 24

Polystyrene Electrical Parts

Example 23 is repeated with polystyrene electrical parts.

The samples containing a melamine based flame retardant and a flame retardant selected from FR1–FR9 exhibit excellent flame retardancy when tested by a known standard test method.

Test methods UL 94 and UL 1694 are relevant.

What is claimed is:

1. A flame retardant polyolefin composition which comprises
(a) a polyolefin polymer and
(b) an effective flame retarding amount of a mixture of
(i) melamine cyanurate and
(ii) bis(2,3-dibromopropyl ether) of tetrabromobisphenol A and where the composition comprises no organic radical sources of the formula

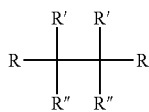

where R=CH$_3$ or C$_2$H$_5$, R'=CH$_3$ and R"=C$_6$H$_5$ and wherein the composition meets a UL 94 rating of V0 and a UL 1694 rating of passing, and where the weight ratio of component (i) to component (ii) is between 10:1 to 1:10.

2. A composition according to claim 1 in which the polyolefin polymer is polyethylene, polypropylene or propylene/ethylene copolymer.

3. A composition according to claim 1 further comprising flame retardant fillers, conventional fillers or nano-scaled fillers.

4. A composition according to claim 1 further comprising antimony compounds.

5. A composition according to claim 1 which further comprises at least one sterically hindered amine stabilizer.

6. A composition according to claim 1 further comprising antimony compounds and at least one sterically hindered amine stabilizer.

7. A composition according to claim 5 where the sterically hindered amine stabilizers are selected from the group consisting of
1-cyclohexyloxy-2 2,6,6-tetramethyl-4-octadecylaminopiperidine;
bis(1-octyloxy-2,2,6,6-tetramethylpiperidin-4-yl) sebacate;
2,4-bis[(1-cyclohexyloxy-2,2,6,6-tetramethylpiperidin-4-yl)butylamino]-6-(2-hydroxyethylamino-s-triazine;
bis(1-cyclohexyloxy-2,2,6,6-tetramethylpiperidin-4-yl) adipate;
2,4-bis[(1-cyclohexyloxy-2,2,6,6-tetramethylpiperidin-4-yl)butylamino]-6-chloro-s-triazine;
1-(2-hydroxy-2-methylpropoxy)-4-hydroxy-2,2,6,6-tetramethylpiperidine;
1-(2-hydroxy-2-methylpropoxy)-4-oxo-2,2,6,6-tetramethylpiperidine;
1-(2-hydroxy-2-methylpropoxy)-4-octadecanoyloxy-2,2,6,6-tetramethylpiperidine;
bis(1-(2-hydroxy-2-methylpropoxy)-2,2,6,6-tetramethylpiperidin-4-yl)sebacate;
bis(1-(2-hydroxy-2-methylpropoxy)-2,2,6,6-tetramethylpiperidin-4-yl)adipate;
2,4-bis{N-[1-(2-hydroxy-2-methylpropoxy)-2,2,6,6-tetramethylpiperidin-4-yl]-N-butylamino}-6-(2-hydroxyethylamino)-s-triazine;
the reaction product of 2,4-bis[(1-cyclohexyloxy-2,2,6,6-tetrmethylpiperidin-4-yl)-butylamino]-6-chloro-s-triazine with N,N'-bis(3-aminopropyl)ethylenediamine) and
the compound of formula

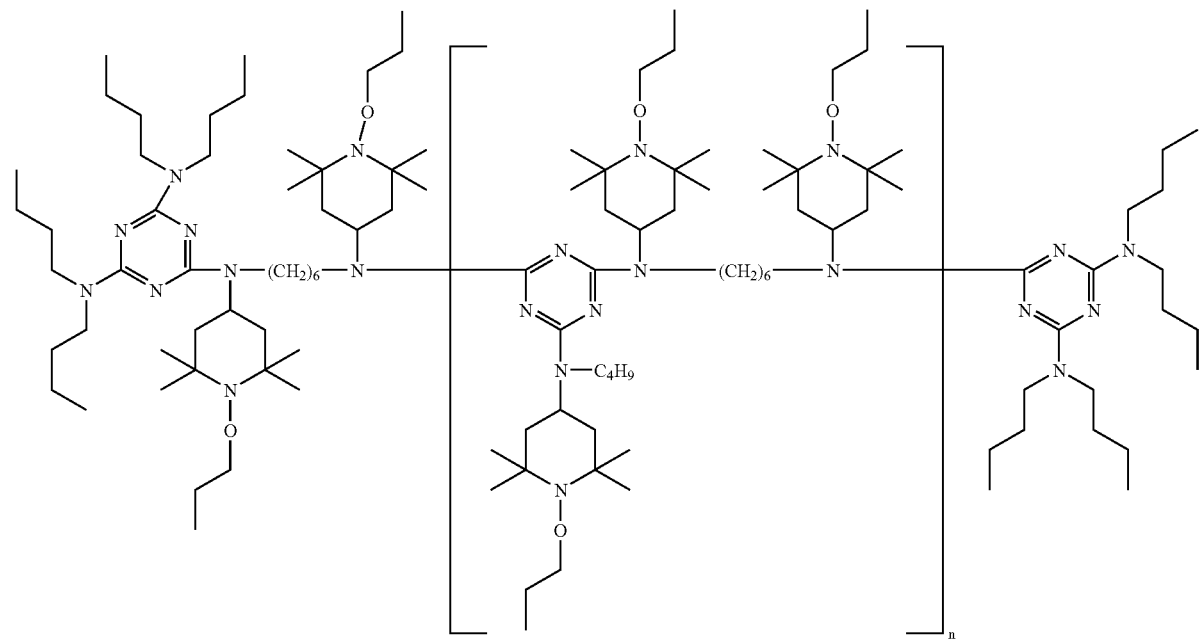

in which n is from 1 to 15.

8. A composition according to claim 1 in which the flame retarding mixture of component (b) is present in an amount from about 0.5% to about 45% by weight based on the polymer substrate (a).

9. A composition according to claim 1 in which the flame retarding mixture of component (b) is present in an amount from about 0.5% to about 15% by weight based on component (a).

10. A composition according to claim 1 comprising a further component selected from the group consisting of pigments, dyes, plasticizers, phenolic antioxidants, thixotropic agents, levelling assistants, basic costabilizers, nitrone stabilizers, amine oxide stabilizers, benzofuranone stabilizers, UV absorbers, sterically hindered amines, metal passivators, metal oxides, organophosphorus compounds, hydroxylamines, and mixtures thereof.

11. A composition according to claim 10 in which the further component is selected from the group consisting of phenolic antioxidants, calcium stearate, zinc stearate, phosphite or phosphonite stabilizers, benzofuranone stabilizers, UV absorbers of the 2-(2'-hydroxyphenyl)benzotriazole or 2-(2-hydroxyphenyl)-1,3,5-triazine classes, and sterically hindered amines.

12. A molded polyolefin article produced from the composition according to claim 1.

13. A molded article according to claim 12 which is a construction article selected from the group consisting of roofing membranes, window profiles, siding and moldings or which is an electrical part selected from the group consisting of plugs, sockets and wire insulation.

14. A molded article according to claim 12 where the polyolefin is polypropylene, polyethylene, propylene/ethylene copolymer or thermoplastic olefin.

15. A molded article according to claim 12 which further comprises flame retardant fillers, conventional fillers or nano-scaled fillers.

16. A molded article according to claim 12 which further comprises antimony compounds.

17. A molded article according to claim 12 further comprising at least one sterically hindered amine stabilizer.

18. A molded article according to claim 12 further comprising antimony compounds and at least one sterically hindered amine stabilizer.

19. A process for imparting flame retardancy to a polyolefin substrate, which process comprises adding to said substrate (i) melamine cyanurate and (ii) bis(2,3-dibromopropyl ether) of tetrabromobisphenol A wherein no organic radical sources of the formula

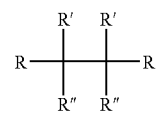

where R=$CH_3$ or $C_2H_5$, R'=$CH_3$ and R"=$C_6H_5$, are added and and wherein the flame retardant substrate meets a UL 94 rating of V0 and a UL 1694 rating of passing, and where the weight ratio of component (i) to component (ii) is between 10:1 to 1:10.

* * * * *